United States Patent
Hikobe et al.

(10) Patent No.: US 11,667,811 B2
(45) Date of Patent: Jun. 6, 2023

(54) COATING COMPOSITION EXCELLENT IN ABRASION RESISTANCE

(71) Applicant: Kanto Denka Kogyo Co., Ltd., Tokyo (JP)

(72) Inventors: Yoshimasa Hikobe, Shibukawa (JP); Yoshitaka Matsuda, Shibukawa (JP)

(73) Assignee: KANTO DENKA KOGYO CO., LTD., Tokyo (JP)

( * ) Notice: Subject to any disclaimer, the term of this patent is extended or adjusted under 35 U.S.C. 154(b) by 0 days.

(21) Appl. No.: 17/637,949

(22) PCT Filed: Sep. 1, 2020

(86) PCT No.: PCT/JP2020/032997
§ 371 (c)(1),
(2) Date: Feb. 24, 2022

(87) PCT Pub. No.: WO2021/045030
PCT Pub. Date: Mar. 11, 2021

(65) Prior Publication Data
US 2022/0282117 A1    Sep. 8, 2022

(30) Foreign Application Priority Data
Sep. 2, 2019 (JP) .............................. JP2019-159648

(51) Int. Cl.
*C09D 175/04* (2006.01)
*C09D 7/20* (2018.01)

(52) U.S. Cl.
CPC ............ *C09D 175/04* (2013.01); *C09D 7/20* (2018.01)

(58) Field of Classification Search
None
See application file for complete search history.

(56) References Cited

U.S. PATENT DOCUMENTS

| 2016/0355690 A1* | 12/2016 | Saito | ............... C09D 123/28 |
| 2018/0079187 A1* | 3/2018 | Satoh | .................... C09J 7/29 |
| 2019/0249027 A1* | 8/2019 | Cedric Chin | ............ B05D 7/00 |
| 2020/0157372 A1 | 5/2020 | Fukada et al. | |
| 2020/0157373 A1 | 5/2020 | Fukada et al. | |

FOREIGN PATENT DOCUMENTS

| JP | 3243674 A | | 10/1991 |
| JP | 200054000 A | | 2/2000 |
| JP | 2001206918 A | * | 7/2001 |
| JP | 2002309054 A | | 10/2002 |
| JP | 201778150 A | | 4/2017 |
| WO | 2018079775 A1 | | 5/2018 |
| WO | 2018181147 A1 | | 10/2018 |
| WO | 2018193926 A1 | | 10/2018 |

OTHER PUBLICATIONS

English translation of International Preliminary Report on Patentability and Written Opinion of the International Searching Authority for PCT/JP2020/032997, dated Mar. 8, 2022 (4 pages).
International Search Report with English Translation issued in corresponding International Application No. PCT/JP2020/032997 dated Nov. 17, 2020 (6 pages).
Written Opinion of International Searching Authority issued in corresponding International Application No. PCT/JP2020/032997 dated Nov. 17, 2020 (3 pages).

* cited by examiner

*Primary Examiner* — Vishal V Vasisth
(74) *Attorney, Agent, or Firm* — Flynn Thiel, P.C.

(57) ABSTRACT

The present invention is a coating composition containing (A) a fluorine-containing copolymer and (B) a polycarbonate diol.

22 Claims, No Drawings

COATING COMPOSITION EXCELLENT IN ABRASION RESISTANCE

This application is a 371 of PCT/JP2020/032997 filed Sep. 1, 2020.

FIELD OF THE INVENTION

The present invention relates to a coating composition, a coated article and a method for forming a cured film.

BACKGROUND OF THE INVENTION

It has widely been practiced to coat or cover articles such as plastic products, synthetic leather or the like with contamination-resistant coatings including fluorine-containing copolymers to prevent contaminants from being adhered to or deposited on the articles. Further, it has been required that abrasion resistance be imparted thereto to prevent peeling-off or abrasion of the films due to wiping-off actions during removal of contaminants.

JP-A 2000-54000 discloses a leather coated with a fluorine-containing resin coating composition, which has an outermost layer of a fluorine-containing resin coating film, in which in stain removing test according to JIS L 0805, a grey scale is grade 4 or more and in ethanol resistance test according to JIS K 6547 by using a clock meter type friction tester, an area of chipped-off fluorine-containing coating film is 50% or less.

JP-A 2017-78150 discloses a curable coating composition comprising a specific organic polyisocyanate compound and a polycarbonate diol having a specific structure.

WO-A 2018/181147 discloses a paint composition comprising a fluorine-containing copolymer, a solvent and a resin particle meeting predetermined conditions.

SUMMARY OF THE INVENTION

The present invention provides a coating composition capable of imparting superior abrasion resistance to articles while maintaining high levels of anti-soiling properties.

The present invention relates to a coating composition containing (A) a fluorine-containing copolymer and (B) a polycarbonate diol.

Moreover, the present invention relates to a coated article having a substrate and a cured film of the aforementioned coating composition of the present invention formed on the substrate.

Further, the present invention relates to a method for forming a cured film including, applying the aforementioned coating composition of the present invention to a substrate to form a coating film, and curing the coating film to form a cured film.

Hereinafter, explanations are given by referring to (A) a fluorine-containing copolymer as component (A) and (B) a polycarbonate diol as component (B).

According to the present invention, provided is a coating composition capable of imparting superior abrasion resistance to articles while maintaining high levels of anti-soiling properties. Moreover, the coating composition of the present invention can impart these effects without impairing the texture of the objects. Therefore, it is suitable for the treatment of soft materials such as synthetic leather, etc.

The effects of the present invention are obtained by combining a fluorine-containing copolymer with a polycarbonate polyol. The coating composition of the present invention can impart superior abrasion resistance to an article to which it is applied without impairing high-levels of anti-soiling properties, even if, for example, formulated with microparticles having a matte effect for the purpose of adjusting the gloss value of the article to an intended one.

EMBODIMENTS OF THE PRESENT INVENTION

Coating Composition

Component (A): Fluorine-Containing Copolymer

Component (A) is a fluorine-containing copolymer. Component (A) is preferably a curable fluorine-containing copolymer and further a thermosetting fluorine-containing copolymer.

Examples of component (A) include a fluorine-containing copolymer (hereinafter referred to as component (A1)) including as polymerization units a fluoroolefin in an amount of 15 to 85 mol % and one or more organic silicon compounds selected from compounds represented by the following general formulas (1) and (2) in an amount of 0.001 to 30 mol %,

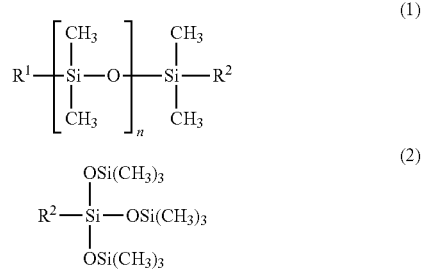

wherein $R^1$ represents an alkyl group with 1 to 6 carbons, $-(CH_2)_r-OOC(CH_3)C=CH_2$ or $-CH=CH_2$, $R^2$ represents $-(CH_2)_r-OOC(CH_3)C=CH_2$ or $-CH-CH_2$, n represents a number of 1 to 420, and r represents a number of 1 to 6.

As the fluoroolefin, an olefin having one or more fluorine atoms in the molecule, for example, vinylidene fluoride, tetrafluoroethylene, chlorotrifluoroethylene, hexafluoropropylene or the like is suitable. These fluoroolefins may each be used alone or may be used in combinations of two or more.

The fluoroolefin occupies 15 to 85 mol % and preferably 25 to 85 mol % in all the monomer units of component (A1). In this range, sufficient water and oil repellencies and anti-soiling properties over a long period of time, as well as sufficient chemical resistance and weather resistance, are obtained. Further, production is also facilitated.

In the general formula (1), n is a number of preferably 1 to 420, more preferably 2 to 350 and further preferably 5 to 200.

The organic silicon compounds represented by the general formula (1) or (2) occupy 0.001 to 30 mol % and preferably 0.005 to 25 mol % in all the monomer units of component (A1). In this range, sufficient water and oil repellencies and anti-soiling properties over a long period of time, as well as sufficient chemical resistance and weather resistance, are obtained. Further, production is also facilitated.

As the organic silicon compounds represented by the general formula (1) or (2), single-end methacrylic-modified polydimethylsiloxanes, single-end acrylic-modified polydimethylsiloxanes, dual-end methacrylic-modified polydimethylsiloxanes or the like are suitable.

The organic silicon compounds represented by the general formula (1) or (2) may each be used alone or may be used in combinations of two or more.

The organic silicon compounds represented by the general formula (1) or (2) have a number average molecular weight of preferably 200 to 30,000.

Examples of the organic silicon compounds represented by the general formula (1) or (2) include at least one organic silicon compound selected from compounds represented by the following formulas (3), (4), (5) and (6):

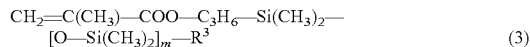

(3)

wherein $R_3$ represents an alkyl group with 1 to 6 carbons, and m represents 1 to 250 and preferably 5 to 200;

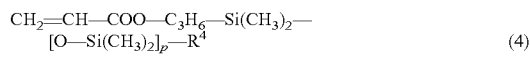

(4)

wherein $R_4$ represents an alkyl group with 1 to 6 carbons, and p represents 1 to 250 and preferably 5 to 200;

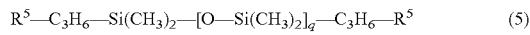

(5)

wherein $R_5$ represents —OOC(CH$_3$)C=CH$_2$, and q represents 1 to 250 and preferably 5 to 200; and

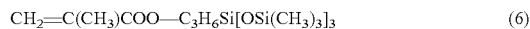

(6)

Component (A1) may include polymerization units of compounds other than the aforementioned fluoroolefin and organic silicon compounds (hereinafter referred to as other monomers). The other monomers are preferably one or more monomers selected from among alkyl vinyl ethers, alkyl allyl ethers, methacrylate esters and acrylate esters (hereinafter referred to as monomer (I)).

Specific examples of the alkyl vinyl ethers include methyl vinyl ether, ethyl vinyl ether, isopropyl vinyl ether, n-propyl vinyl ether, n-butyl vinyl ether, isobutyl vinyl ether, n-pentyl vinyl ether, isopentyl vinyl ether, tertiary pentyl vinyl ether, n-hexyl vinyl ether, isohexyl vinyl ether, 2-ethylhexyl vinyl ether, cyclohexyl vinyl ether, octadecyl vinyl ether, glycidyl vinyl ether, glycidyl oxymethyl vinyl ether, glycidyloxyethyl vinyl ether, glycidyloxybutyl vinyl ether, glycidyloxypentyl vinyl ether, glycidyloxycyclohexyl vinyl ether, hydroxymethyl vinyl ether, hydroxyethyl vinyl ether, hydroxypropyl vinyl ether, hydroxybutyl vinyl ether, hydroxypentyl vinyl ether, hydroxyhexyl vinyl ether, 4-hydroxycyclohexyl vinyl ether, 2-(perfluorohexyl)ethyl vinyl ether and the like.

Moreover, specific examples of the alkyl allyl ethers include ethyl allyl ether, butyl allyl ether, cyclohexyl allyl ether, isobutyl allyl ether, n-propyl allyl ether, allyl glycidyl ether, 3-allyloxy-1,2-propanediol, glycerol-α-monoallyl ether, ethylene glycol monoallyl ether and the like.

Moreover, specific examples of the acrylate esters include methyl acrylate, ethyl acrylate, n-butyl acrylate, t-butyl acrylate, 2-hydroxyethyl acrylate, 2-hydroxybutyl acrylate, 2-(perfluorobutyl)ethyl acrylate, 2-(perfluorohexyl)ethyl acrylate and the like.

Moreover, specific examples of the methacrylate esters include methyl methacrylate, ethyl methacrylate, n-butyl methacrylate, t-butyl methacrylate, glycidyl methacrylate, cyclohexyl methacrylate, 2-hydroxyethyl methacrylate, 3-hydroxypropyl methacrylate, 4-hydroxybutyl methacrylate, 2-hydroxypropyl methacrylate, dicyclopentanyl methacrylate, 2-(perfluorobutyl)ethyl methacrylate, 2-(perfluorohexyl)ethyl methacrylate and the like.

When monomer (I) is included, the proportion of polymerization units of monomer (I) in all the polymerization units of component (A1) is preferably 1 to 50 mol %.

Moreover, examples of the other monomers include, for example, olefins such as ethylene, propylene and the like, haloolefins such as vinyl chloride, vinylidene chloride and the like, and esters of an alkane carboxylic acid and a vinyl alcohol, such as vinyl acetate, vinyl n-butyrate, vinyl isobutyrate, vinyl propionate and the like. Polymerization units of these monomers are in an amount of preferably less than 20 mol % in all the polymerization units of component (A1).

Component (A1) can be produced by copolymerizing a mixture of predetermined proportions of monomers using a polymerization initiator. As the polymerization initiator, a water-soluble or oil-soluble one is appropriately used depending on the type of a solvent used to meet a polymerization manner or requirements. As the oil-soluble initiator, for example, a peroxyester-type peroxide such as t-butyl peroxyisobutyrate, t-butyl peroxyacetate or the like; a dialkyl peroxydicarbonate such as diisopropyl peroxydicarbonate, di-normal propyl peroxydicarbonate or the like; or benzoyl peroxide, azobisisobutyronitrile or the like is used. As the water-soluble initiator, for example, a persulfate such as potassium persulfate or the like, hydrogen peroxide, or a redox initiator made of a combination of any of them and a reducing agent such as sodium hydrogen sulfite, sodium thiosulfate or the like is used, or further, an inorganic initiator with a small amount of iron, a ferrous salt, silver nitrate or the like coexisting with any of them or an organic initiator of a dibasic acid salt such as succinic acid peroxide, diglutaric acid peroxide, monosuccinic acid peroxide or the like is, among others, used. While these polymerization initiators are used in amounts that are appropriately selected depending on the types thereof, copolymerization reaction conditions or the like, the amounts usually fall within the range of 0.005 to 5 mass % and preferably 0.1 to 2 mass % relative to the total amount of monomers used.

While the polymerization method is not particularly limited and bulk polymerization, suspension polymerization, emulsion polymerization, solution polymerization or the like can, for example, be used, preferable is solution polymerization using as a solvent any of ketones such as methyl ethyl ketone and the like, carboxylate esters such as butyl acetate and the like, aliphatic saturated hydrocarbons such as hexane and the like, aromatic hydrocarbons such as xylene and the like, alcohols such as isopropyl alcohol and the like, saturated halogenated hydrocarbons having one or more fluorine atoms, and the like, or emulsion polymerization in an aqueous solvent. Further, examples of a solvent particularly preferable for obtaining the fluorine-containing copolymer by solution polymerization include ethyl acetate, butyl acetate, hexane, cyclohexane, heptane, xylene, toluene, isopropyl alcohol and methyl ethyl ketone.

In the case of copolymerization in an aqueous solvent (emulsion polymerization or suspension polymerization), it is usually desirable that a suspending agent or an emulsifier be used as a dispersion stabilizer, and a basic buffer be added to make the pH value of a reaction liquid during polymerization 4 or more and preferably 6 or more.

Reaction temperature in these copolymerization reactions is appropriately selected within the range of usually −30° C. to 150° C. depending on the types of polymerization media of polymerization initiators. For example, when copolymerization is carried out in a solvent, the range is usually 0° C. to 100° C. and preferably 10° C. to 90° C. Reaction pressure is not particularly limited, but is selected within the range of usually 0.1 to 10 MPa and preferably 0.1 to 5 MPa.

Further, the copolymerization reactions can be carried out by adding appropriate chain transfer agents.

When acidic substances such as hydrogen fluoride and the like are desorbed from monomers or polymers during the polymerization to make a polymerization solution acidic and cause thickening or gelation of a solution including the polymer during its storage, or when a curing catalyst is used for a curing reaction of the polymer and a polyvalent isocyanate copolymer, and these acidic substances inhibit the catalytic reaction, the acidic substances such as hydrogen fluoride and the like may be neutralized by adding thereto organic amines such as dimethylamine, diethylamine, dipropylamine, diisopropylamine, dibutylamine, diisobutylamine, dipentylamine, diisopentylamine, dihexylamine, diheptylamine, dioctylamine, trimethylamine, triethylamine, tripropylamine, triisopropylamine, tributylamine, triisobutylamine, tripentylamine, triisopentylamine, trihexylamine, triheptylamine, trioctylamine, diazabicycloundecene, 1,4-diazabicyclo[2.2.2]octane and the like, ion exchange resins such as basic anion exchange resins and the like, alkali metal salts or alkaline earth metal salts such as sodium hydrogen carbonate, sodium carbonate, potassium hydrogen carbonate, potassium carbonate, sodium phosphate and the like, metal oxides such as alumina, zirconia, titania and the like, zeolites such as molecular sieves and the like, etc. The timing of addition may be before polymerization, during polymerization or after polymerization, or may be divided into two or more times.

Component (A) and further component (A1) preferably have a reactive group such as a hydroxy group or an epoxy group, which makes them curable. For example, using a monomer having a hydroxyl group or an epoxy group in monomer (I) makes component (A) and further component (A1) curable fluorine-containing copolymers.

When component (A) is a curable fluorine-containing copolymer, the coating composition of the present invention preferably contains a curing agent for component (A) (hereinafter simply referred to as a curing agent).

Examples of the curing agent include polyvalent isocyanate compounds. Specific examples thereof include hexamethylene diisocyanate, pentamethylene diisocyanate, isophorone diisocyanate, 2,4-tolylene diisocyanate, diphenylmethane-4,4'-diisocyanate, xylylene diisocyanate, methylcyclohexyl diisocyanate, trimethylhexamethylene diisocyanate, n-pentane-1,4-diisocyanate, lysine diisocyanate and the like. Among these, that which has an unsaturated bond in its structure except for the isocyanate group may be a hydrogen-added product thereof. In addition, a modified product such as an isocyanurate-modified product, a biuret-modified product, an adduct-modified product, an allophanate-modified product, a carbodiimide-modified product, a urea-modified product or a urethane-modified product made of any of the aforementioned polyvalent isocyanate compounds may be used. It is also preferable that a non-yellowing polyvalent isocyanate compound be used.

When component (A) is a curable fluorine-containing copolymer, it can also be heat cured by further using a melamine curing agent, a urea resin curing agent, a polybasic acid curing agent or the like. Examples of the melamine curing agent include, for example, butylated melamines, methylated melamines, epoxy-modified melamines and the like, and a curing agent with a different degree of modification can appropriately be used depending on applications, and the degree of self-condensation can also appropriately be selected. Examples of the urea resin curing agent include, for example, methylated urea resins, butylated urea resins and the like, and examples of the polybasic acid curing agent include, for example, long-chain aliphatic dicarboxylic acids, aromatic polyvalent carboxylic acids, acid anhydrides thereof, and the like.

Further, a blocked polyvalent isocyanate can also favorably be used as the curing agent. In addition, when a melamine curing agent or a urea resin curing agent is used, an acidic catalyst can also be added to accelerate the curing.

When the fluorine-containing copolymer of the present invention contains an epoxy group as its curing part, examples of the curing agent include those used in ordinary curable epoxy coatings, for example, aliphatic amines such as diethylenetriamine, triethylenetetramine, tetraethylenepentamine and the like or modified products thereof, aromatic amines such as meta-phenylenediamine, p-p'-diaminodiphenylmethane, diaminophenylsulfone and the like or modified products thereof, and polyvalent carboxylic acids such as phthalic anhydride, maleic anhydride, oxalic anhydride, hexahydrophthalic acid, pimelic acid and the like or anhydrides thereof, etc.

When component (A) is a curable fluorine-containing copolymer, the coating composition of the present invention contains the curing agent in an amount of preferably 1 to 300 parts by mass, more preferably 2 to 250 parts by mass and further preferably 3 to 200 parts by mass relative to 100 parts by mass of component (A).

Component (A) and further component (A1) have a number average molecular weight of preferably $0.5 \times 10^4$ to $7.0 \times 10^4$, more preferably $0.5 \times 10^4$ to $5.0 \times 10^4$, more preferably $1.0 \times 10^4$ to $3.0 \times 10^4$ and more preferably $1.0 \times 10^4$ to $2.0 \times 10^4$.

Component (A) and further component (A1) have a weight average molecular weight of preferably $0.5 \times 10^4$ to $5.0 \times 10^5$, more preferably $1.0 \times 10^4$ to $3.0 \times 10^5$ and more preferably $2.0 \times 10^4$ to $2.0 \times 10^5$.

Here, the number average molecular weights and the weight average molecular weights of component (A) and further component (A1) are each measured with gel permeation chromatography under the following conditions.

Measurement device: HLC-8320GPC (Tosoh Corporation)

Column: TDgel SuperHZM-M (Tosoh Corporation)

Detector: RI (differential refractometer attached to the device)

Standard substance: polystyrene

Data processing: EcoSEC-WS (Tosoh Corporation)

Measurement conditions: column temperature (40° C.), solvent (tetrahydrofuran), flow rate (0.35 mL/min), sample concentration (0.14 wt %), sample injection volume (20 μL)

In the present invention, preferable is a combination that component (A) is a curable fluorine-containing copolymer having a hydroxyl group, and the curing agent is a modified product made of a polyvalent isocyanate compound, and specifically, an isocyanurate-modified product, an adduct-modified product or an allophanate-modified product of a polyvalent isocyanate compound, or a mixture thereof. In this case, the equivalent ratio between the hydroxyl groups (OH) of component (A) and component (B) described below and the NCO group of the curing agent, NCO/OH, is preferably 0.3 to 2.0 and more preferably 0.5 to 1.5.

The coating composition of the present invention contains component (A) in an amount of preferably 1 to 90 mass %, more preferably 1 to 80 mass %, further preferably 1 to 50 mass %, furthermore preferably 1 to 30 mass % and furthermore preferably 3 to 30 mass %.

Component (B): Polycarbonate Diol

Component (B) is a polycarbonate diol. Examples of component (B) include a polycarbonate diol represented by the following formula (1b):

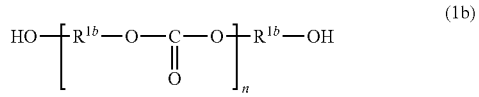

wherein $R^{1b}$ is a divalent hydrocarbon group with 2 to 20 carbons, and n is a number of 1 to 1000.

In the formula (1b), Rib has preferably 2 to 15, more preferably 2 to 10, further preferably 2 to 8 and furthermore preferably 2 to 6 carbons. The hydrocarbon group of Rib is preferably an alkylene group and further a linear alkylene group (polymethylene group).

In the formula (1b), n is 1 to 1000, preferably 1 to 800, more preferably 1 to 500, more preferably 1 to 300, more preferably 1 to 100 and more preferably 1 to 80.

Component (B) can be synthesized by transesterification using as raw materials, for example, a diol represented by HO-Rib-OH ($R^{1b}$ is as mentioned above) and a carbonate ester.

Further, a commercially available product can be used as component (B). Examples of the commercially available product include, for example, DURANOL "G3450J," "G3452," "T4691," "T4692," "T4671," "G4672," "T5650E," "T5650J," "T5651," "T5652," "T6001" and "T6002" manufactured by Asahi Kasei Corporation, BENEBiOL "NL1010DB," "NL2010DB," "NL3010DB," "NL1005B," "NL2005B," "NL1030B," "HS0830B," "HS0840B," "HS0840H" and "HS0850S" manufactured by Mitsubishi Chemical Corporation, NIPPOLLAN "981," "980R," "982R," "976," "965," "963," "964" and "968" manufactured by Tosoh Corporation, ETERNACOLL "UH-50," "UH-100," "UH-200," "UH-300," "PH-50," "PH-100," "PH-200" and "PH-300" manufactured by Ube Industries, Ltd., Kuraray Polyol "C-590," "C-1090," "C-2090" and "C-3090" manufactured by KURARAY CO., LTD., and the like.

Component (B) may be a polycarbonate diol in which the diol components are two or more diols with different carbon numbers. In other words, component (B) may be a polycarbonate diol obtained by using two or more diols with different carbon numbers. For example, component (B) may be a polycarbonate diol in which the diol components are diols having 2 to 6 carbons and which includes two or more diol components with different carbon numbers. Note that the diol components correspond to —O—$R^{1b}$—O-part in the formula (1b).

Examples of component (B) include
a polycarbonate diol in which the diol components are a diol having 3 carbons (1,3-propanediol) and a diol having 4 carbons (1,4-butanediol),
a polycarbonate diol in which the diol components are a diol having 4 carbons (1,4-butanediol) and a diol having 6 carbons (1,6-hexanediol), and
a polycarbonate diol in which the diol components are a diol having 5 carbons (1,5-pentanediol) and a diol having 6 carbons (1,6-hexanediol).

Component (B) has a number average molecular weight of preferably 300 to 10,000, more preferably 500 to 5,000, more preferably 800 to 5,000 and further preferably 1,000 to 3,000. This number average molecular weight is measured with gel permeation chromatography using the device below.

Measurement device: HLC-8320GPC (Tosoh Corporation)
Column: "TSKgel SuperH1000" (Tosoh Corporation)
"TSKgel SuperH2000" (Tosoh Corporation)
"TSKgel SuperH3000" (Tosoh Corporation)
Standard substance: polystyrene
Solvent: tetrahydrofuran
Detector: RI (differential refractometer attached to the device)

The coating composition of the present invention contains component (B) in an amount of preferably 0.1 to 50 mass %, more preferably 0.5 to 40 mass % and further preferably 1 to 30 mass %.

The coating composition of the present invention contains component (B) in an amount of preferably 1 to 300 parts by mass, more preferably 3 to 250 parts by mass and more preferably 10 to 250 parts by mass relative to 100 parts by mass of component (A).

Optional Component and Others

The coating composition of the present invention preferably contains (C) a solvent [hereinafter referred to as component (C)]. Component (C) preferably dissolves component (A) and/or component (B) and further component (A) and component (B). Component (C) is preferably an organic solvent. Examples of the organic solvent include esters, ketones, alcohols, aliphatic hydrocarbons and the like. Specific examples thereof include carboxylate esters such as ethyl acetate, propyl acetate, butyl acetate, amyl acetate and the like, ketones such as methyl ethyl ketone, methyl isobutyl ketone and the like, alcohols such as methyl alcohol, ethyl alcohol, isopropyl alcohol, methoxypropanol, ethoxypropanol and the like, and alkanes such as n-pentane, i-pentane, n-hexane, i-hexane, cyclohexane, n-heptane, i-heptane, 2,2,4-trimethylpentane and the like. Moreover, the solvents known as Solvesso (product name) and mineral spirits can also be used. Moreover, ethers such as methyl cellosolve, ethylene glycol monomethyl ether and the like can also be used. Moreover, aromatic hydrocarbons such as benzene, toluene, xylene and the like can also be used. Moreover, pyrrolidones such as N-methylpyrrolidone and the like can also be used. One or two or more of the above organic solvents can be used.

Water may be used as the solvent of component (C), in which case, it is preferable that an organic solvent also be contained. When water is contained, the mass ratio of water/(water+organic solvent) is preferably 0.01 to 10.

The coating composition of the present invention contains component (C) in an amount of preferably 1 to 99 mass %, more preferably 5 to 99 mass %, further preferably 10 to 98 mass %, further preferably 20 to 95 mass %, further preferably 40 to 95 mass % and further preferably 50 to 95 mass %.

The coating composition of the present invention can be used with a curing catalyst being added thereto. Examples of the curing catalyst include publicly-known catalysts such as metal complexes including a metal such as Sn, Zn, Zr, Ti, Bi, Al, Li, Ca or the like, metal salts, amines, organic acids, acidic phosphate esters and the like, and mixtures thereof.

In addition, an acrylic resin, a urethane resin, a silicone resin, and varnishes thereof, etc. can be contained as resins other than component (A).

The coating composition of the present invention can contain resin microparticles, for example, in consideration of gloss to be imparted to objects. The resin microparticles have an average particle size of, for example, 0.1 to 50 µm. The average particle size of the resin microparticles can be measured by microscope observation (with an objective lens magnification of 50×) using the Shimadzu micro compression testing machine MCT-510 and an observation kit attached thereto (SHIMADZU CORPORATION). Examples of the resin microparticles include those made of one or more resins selected from a methacrylic resin, an acrylic resin, a silicone resin, a urethane resin, a melamine resin, a polystyrene resin, a fluorine resin, a polyethylene terephthalate resin, a polyether ether ketone resin, a polycarbonate resin, a polyamide resin and a polyamide imide resin. The resin microparticles are contained in an amount of, for example, preferably 10 to 200 parts by mass relative to 100 parts by mass of component (A). WO-A 2018/181147 can be referred to for the resin microparticles. When the coating composition of the present invention contains resin microparticles, it can further contain a silicone-based or another surface treatment agent for enhancing dispersibility thereof.

The coating composition of the present invention can contain optional components other than components (A) and (B) and optional component (C) in the range that the effects of the present invention are not impaired. Examples of the optional components include dispersants, plasticizers, thickeners, defoamers, anti-settling agents, leveling agents, antiseptics, antibacterial agents, antiviral agents, antifungal agents, antioxidants, anti-oxidizing agents, flame retardants, light stabilizers, ultraviolet absorbers, lubricants, anti-freezing agents, film-forming aids, color separation inhibitors, pH adjusters, surfactants, anti-skinning agents, catalysts, moisture absorbents, pigments, deodorants, silane coupling agents, antistatic agents, water repellents, oil repellents, rust inhibitors (such as silicone oil or the like) and the like.

The coating composition of the present invention can be used as a matte coating, a contamination-resistant coating or the like.

Coated Article

The present invention provides a coated article having a substrate and a cured film of the aforementioned coating composition of the present invention formed on the substrate. The matters mentioned in the coating composition of the present invention can appropriately be applied to the coated article of the present invention.

Examples of the substrate include, for example, iron, stainless, aluminum, etc. and metals of surface-treated products thereof, cement-based substrates such as cement, lime, gypsum, etc., plastics such as polyurethane, polyester, polyvinyl chloride, polyolefin, polycarbonate, ABS, acrylic resins, etc., and the like. Further, examples thereof include glass, wood, ceramics and the like. These substrates, for example, may undergo in advance base preparation by sealers appropriate for the types of substrates. In addition, they may also be substrates having coating films of various coatings other than the coating composition of the present invention formed on the surfaces thereof.

The substrate is preferably a substrate formed to include a material selected from polyurethane, vinyl chloride, polyolefin, polyester, glass and metal, and more preferably a substrate formed to include a material selected from polyurethane, vinyl chloride and polyolefin. The substrate is preferably a material known as so-called synthetic leather. The substrate is preferably synthetic leather made of a material selected from, for example, wet polyurethane, dry polyurethane, aqueous urethane foamed synthetic leather and vinyl chloride.

Examples of the substrate include a substrate in the form of a film, a substrate in the form of a sheet and a molded product in a form other than these. The substrate may either be a molded product processed for a raw material or a molded product processed for a product. Specific examples of the substrate in the form of a film include polyurethane films, vinyl chloride films, PET films, acrylic films and the like. Moreover, examples of the substrate in the form of a sheet include wet polyurethane synthetic leather sheets, dry polyurethane synthetic leather sheets, urethane rubber sheets, vinyl chloride synthetic leather sheets and the like. Examples of the above molded product include acrylic molded products, polycarbonate molded products, ABS molded products, unsaturated polyester molded products, glass and the like in any forms.

On the coated article of the present invention, the cured film has a film thickness of preferably 0.1 to 100 µm, more preferably 0.2 to 80 µm and further preferably 0.5 to 60 µm.

The cured film has a 60° gloss value of preferably 10 or less, more preferably 5 or less and further preferably 3 or less.

The 60° gloss value of the cured film is measured by micro-TRI-gloss (BYK Additives & Instruments) with a level of n=3.

Method for Forming Cured Film

The present invention provides a method for forming a cured film including, applying the aforementioned coating composition of the present invention to a substrate to form a coating film, and curing the coating film to form a cured film. The matters mentioned in the coating composition and coated article of the present invention can appropriately be applied to the method for forming a cured film of the present invention.

The specific examples of the substrate are the same as those for the coated article of the present invention, and so are the preferable modes thereof. The substrate may either be a molded product processed for a raw material or a molded product processed for a product.

As a method for applying the coating composition of the present invention to a substrate, publicly-known methods can be adopted depending on forms, materials or the like of the substrate, and examples thereof include methods such as, for example, gravure coater, roll coater, reverse roll coater, comma coater, doctor blade coater, bar coater, kiss roll coater, roller coating, spray coating, electrostatic spray coating, curtain coating, immersion coating, rotary screen printing, brush coating and the like. The amount of the coating composition applied or the thickness of the coating film can appropriately be determined in consideration of an intended film thickness of the cured film and in light of the composition of the coating composition or the like.

The coating film formed on the substrate is cured by heating it to preferably 30 to 250° C. and more preferably 40 to 150° C.

The preferable ranges of the film thickness and the 60° gloss value of the cured film are the same as those for the coated article of the present invention.

The film thickness of the cured film of the present invention is measured by cross-sectional observation or the like using a contact type film thickness gauge, an electromagnetic film thickness gauge, an eddy current film thickness gauge, an optical interference film thickness gauge, a spectroscopic ellipsometer or a microscope (optical microscope, microscope, SEM, TEM or the like). In addition, the film thickness of the cured film can also be estimated from a simple calculation value from an estimated wet film thickness determined depending on a coating method or means and based on the solids concentration of the coating or the specific gravity of the composition. For example, when the application is made such that the wet film thickness is 46 μm, and the coating has a solids concentration of 15 mass % and the coating composition has a specific gravity of 0.9, the estimated dry film thickness can be determined to be 46 μm×0.15×0.9=6.21 μm. The film thickness of the coating film (wet state) can be determined in such a manner.

The present invention also provides a method for producing a coated article including, applying the aforementioned coating composition of the present invention to a substrate to form a coating film, and curing the coating film to form a cured film. The matters mentioned in the coating composition, coated article and method for forming a cured film of the present invention can appropriately be applied to this method.

EXAMPLES

Synthesis Example 1

A curable fluorine-containing copolymer was prepared in the following manner.

In an autoclave (pressure resistance 10 MPa) 1 L in inner volume with a stainless stirrer after deaeration, 96 g of vinylidene fluoride (hereinafter abbreviated as VDF), 84 g of tetrafluoroethylene (hereinafter abbreviated as TFE), 14.9 g of ethyl vinyl ether (hereinafter abbreviated as EVE), 52.2 g of hydroxybutyl vinyl ether (hereinafter abbreviated as HBVE), 10.5 g of methacryl-modified silicone oil A (number average molecular weight about 3500) represented by the following structural formula, 400 ml of butyl acetate and 1.3 g of t-butyl peroxy pivalate were placed, and the inner temperature was raised to 60° C. while they were stirred.
Methacryl-Modified Silicone Oil A:

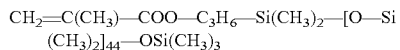

Thereafter, the reaction was continued while they were stirred, and 20 hours later, stirring was stopped and the reaction was finished. The resultant copolymer was isolated by drying under reduced pressure. The yield of the copolymer was 242 g and the reaction percentage of the monomers was 94%. The resultant copolymer had a hydroxyl value of 104 mgKOH/g resin measured by acetylation with acetic anhydride, a fluorine content of 47 mass % by combustion method, and a number average molecular weight of $1.9 \times 10^4$ measured by GPC (gel permeation chromatography). This copolymer was dissolved in butyl acetate to form a butyl acetate solution with a concentration of 20 mass % (varnish), which was used to prepare coating compositions.

Example 1

(1) Coating Composition

Coating compositions containing the curable fluorine-containing copolymer, a polycarbonate diol, a solvent, a curing agent and the like in the compositions shown in the tables were prepared. Here, the components used for the coating compositions were as follows.

[Component (A)]
Curable fluorine-containing copolymer: curable fluorine-containing copolymer obtained in the aforementioned synthesis example 1

[Curing Agent for Component (A)]
Curing agent: adduct-modified product of isophorone diisocyanate (product name: TAKENATE D-140N (Mitsui Chemicals, Inc.), solids content: 75%, NCO content rate: 10.5 mass %)

[Component (B)]
Polycarbonate diol B1: a copolymer with a number average molecular weight of 2000 g/mol, a solids content of 100%, an OH value of 51 to 61 mgKOH/g resin and a melting point of in which the diol components are 1,3-propanediol and 1,4-butanediol, product name: DURANOL G3452 (Asahi Kasei Corporation)

Polycarbonate diol B2: a copolymer with a number average molecular weight of 2000 g/mol, a solids content of 100%, an OH value of 46 to 56 mgKOH/g resin and a melting point of 5 to 15° C., in which the diol components are 1,4-butanediol and 1,6-hexanediol, product name: DURANOL G4672 (Asahi Kasei Corporation)

Polycarbonate diol B3: a copolymer with a number average molecular weight of 2000 g/mol, a solids content of 100%, an OH value of 51 to 61 mgKOH/g resin and a melting point of −5° C., in which the diol components are 1,5-pentanediol and 1,6-hexanediol, product name: DURANOL T5652 (Asahi Kasei Corporation)

[Component (C)]
Solvent: butyl acetate

[Other Components]
Resin microparticle X1: organic modified polymer microparticles, average particle size: 5 μm, specific gravity: 1.25, melting point: 175° C.

Resin microparticle X2: acrylic resin microparticles, average particle size: 3 μm, density (25° C.): 1.1 g/ml, refractive index: 1.49, thermal decomposition temperature: 300° C. (under nitrogen)

Resin microparticle X3: fluorine resin microparticles, average particle size: 3 μm, specific gravity: 2.1 to 2.2, melting point: 310 to 320° C.

Surface adjusting agent: polyester-modified silicone-based surface adjusting agent, solids content: 25%, density (20° C.) 0.92 g/ml, OH value: 35 mgKOH/g resin Silicone oil: single-end carbinol-modified product, specific gravity (25° C.): 0.97, refractive index (25° C.): 1.406, average molecular weight: 4600 g/mol, OH value: 12 mgKOH/g resin The coating compositions were prepared according to the following manner.

To 100 parts by mass of the varnish made of component (A) (hydroxyl value of 104 mgKOH/g resin) in an amount of 30 mass % and component (C) as the balance, a polycarbonate diol of component (B), other components in parts by mass shown in Table 1 and further component (C) in an amount of 1131.2 parts by mass were added, and they were shaken in a paint shaker for 30 minutes. The curing agent was added thereto in an amount of 57.7 parts by mass to make each coating composition. The curing agent was added in such an amount as made NCO/OH between the hydroxyl groups (OH) of components (A) and (B) and the isocyanate group (NCO) of the curing agent 1.1 (mass ratio). The coating compositions were of the compositions shown in the tables. Note that mass % in the tables is mass % expressed in terms of an active ingredient.

(2) Preparation of Coated Article

Each coating composition was applied to a substrate by a bar coater (manufactured by Dai-ichi Rika, K.K., No. 16) such that the dry film thickness was 5 μm. Here, as the substrate, a commercially available wet urethane synthetic leather substrate was used. The substrate coated with the coating composition was treated by heating at 120° C. for 1 minute, and then, at 100° C. for 24 hours. Thus, a coated article (polyurethane synthetic leather subjected to matte and contamination-resistant treatment) was obtained.

(3) Evaluation

The following evaluations were conducted on the coated articles. The results are shown in Table 1.

(3-1) 60° Gloss Value

The 60° gloss value of the coating film surfaces was measured by micro-TRI-gloss (BYK Additives & Instruments) with a level of n=3.

(3-2) Anti-Soiling Properties

On the surface of each coated article immediately after preparation, an arbitrary figure was drawn with an oil-based ballpoint pen or an oil-based felt tipped pen, and a state after the figure was wiped off with dry tissue paper was visually observed. Here, as the oil-based ballpoint pen, ZEBRA JIM-KNOCK black ink (ZEBRA CO., LTD.) was used. Further, as the oil-based felt tipped pen, Magic Ink black ink (Teranishi Chemical Industry Co., Ltd.) was used. The removability was judged by the following criteria and evaluated as anti-soiling properties in five levels.

Judgement Criteria for Removability of Black Pigment of Ink

5: the black pigment has completely been removed, and no trace of coloring matter can be seen 4: the black pigment has completely been removed, but slight traces of coloring matter can be seen 3: the black pigment has completely been removed, but traces of coloring matter can be seen 2: residual black pigment can be seen, and traces of coloring matter can also be seen 1: the black pigment has not been removed at all (3-3) Abrasion Resistance On TriboGear TYPE: 14FW Surface Property Tester (SHINTO Scientific Co., Ltd.), the surface of each coated article was abraded with canvas No. 6 under the conditions of a load of 1500 g, a rate of 6000 m/min and a moving distance of 100 mm, and the abrasion resistance thereof was evaluated on the basis of the number of round trips until the substrate was exposed. In the measurement, the abrasion treatment was performed until 3000 round trips were made, and the case where the substrate was not exposed then was taken as "more than 3000."

TABLE 1

|  |  |  | Example | | | | | Comparative example | | | |
| --- | --- | --- | --- | --- | --- | --- | --- | --- | --- | --- | --- |
|  |  |  | 1 | 2 | 3 | 4 | 5 | 1 | 2 | 3 | 4 |
| Coating composition (mass %) | (A) | Curable fluorine-containing copolymer | 6.84 | 6.84 | 3.16 | 5.06 | 6.81 | 9.21 |  |  |  |
|  | (B) | Polycarbonate diol B1 | 2.93 |  |  |  |  |  | 11.41 |  |  |
|  |  | Polycarbonate diol B2 |  | 2.93 |  |  |  |  |  | 11.40 |  |
|  |  | Polycarbonate diol B3 |  |  | 7.38 | 5.06 | 2.92 |  |  |  | 11.25 |
|  |  | Curing agent | 6.97 | 6.98 | 5.94 | 6.50 | 7.02 | 7.73 | 4.79 | 4.80 | 5.00 |
|  | (C) | Solvent | 83.26 | 83.25 | 83.52 | 83.38 | 83.25 | 83.06 | 83.80 | 83.80 | 83.75 |
| 60° gloss value |  |  | 15.3 | 14.0 | 8.1 | 12.1 | 14.0 | 16.2 | 18.7 | 21.7 | 19.1 |
| Anti-soiling properties against oil-based ballpoint pen |  |  | 5 | 5 | 4 | 5 | 5 | 5 | 2 | 2 | 2 |
| Anti-soiling properties against permanent marker |  |  | 4 | 4 | 4 | 4 | 4 | 5 | 2 | 2 | 2 |
| Abrasion resistance (number of times) |  |  | 1500 | 1800 | 1400 | 1300 | 2300 | 1000 | 500 | 1000 | 1000 |

TABLE 2

|  |  |  | Example | | | | | | | | | Comparative example | | | |
| --- | --- | --- | --- | --- | --- | --- | --- | --- | --- | --- | --- | --- | --- | --- | --- |
|  |  |  | 6 | 7 | 8 | 9 | 10 | 11 | 12 | 13 | 14 | 5 | 6 | 7 | 8 |
| Coating composition (mass %) | (A) | Fluorine-containing copolymer | 2.01 | 3.26 | 4.44 | 2.01 | 3.26 | 4.44 | 2.00 | 3.24 | 4.43 | 7.78 |  |  |  |
|  | (B) | Polycarbonate diol B1 | 4.69 | 3.26 | 1.90 |  |  |  |  |  |  |  | 7.07 |  |  |
|  |  | Polycarbonate diol B2 |  |  |  | 4.69 | 3.26 | 1.90 |  |  |  |  |  | 7.07 |  |
|  |  | Polycarbonate diol B3 |  |  |  |  |  |  | 4.66 | 3.24 | 1.90 |  |  |  | 7.01 |
|  |  | Resin microparticle X1 | 0.67 | 0.65 | 0.64 | 0.67 | 0.65 | 0.64 | 0.67 | 0.65 | 0.63 | 2.33 | 0.71 | 0.71 | 0.70 |
|  |  | Resin microparticle X2 | 2.01 | 1.96 | 1.90 | 2.01 | 1.96 | 1.90 | 2.00 | 1.95 | 1.90 |  | 2.12 | 2.12 | 2.10 |
|  |  | Resin microparticle X3 | 0.67 | 0.65 | 0.64 | 0.67 | 0.65 | 0.64 | 0.67 | 0.65 | 0.63 |  | 0.71 | 0.71 | 0.70 |
|  |  | Surface adjusting agent | 0.27 | 0.26 | 0.25 | 0.27 | 0.26 | 0.25 | 0.26 | 0.26 | 0.25 |  | 0.28 | 0.28 | 0.28 |

TABLE 2-continued

| | Example | | | | | | | | | Comparative example | | | |
|---|---|---|---|---|---|---|---|---|---|---|---|---|---|
| | 6 | 7 | 8 | 9 | 10 | 11 | 12 | 13 | 14 | 5 | 6 | 7 | 8 |
| Silicone oil | 2.01 | 1.96 | 1.90 | 2.01 | 1.96 | 1.90 | 2.00 | 1.95 | 1.90 | | 2.12 | 2.12 | 2.10 |
| Curing agent | 3.87 | 4.31 | 4.73 | 3.87 | 4.31 | 4.73 | 3.96 | 4.37 | 4.76 | 6.52 | 2.97 | 2.98 | 3.12 |
| (C) Solvent | 83.80 | 83.69 | 83.60 | 83.80 | 83.69 | 83.60 | 83.78 | 83.69 | 83.60 | 83.37 | 84.02 | 84.01 | 83.99 |
| 60° gloss value | 3.5 | 2.9 | 3.4 | 3.3 | 2.9 | 3.3 | 3.3 | 3.0 | 3.5 | 3.3 | 2.2 | 2.2 | 2.4 |
| Anti-soiling properties against oil-based ballpoint pen | 4 | 3 | 4 | 4 | 3 | 4 | 4 | 3 | 4 | 4 | 1 | 1 | 1 |
| Anti-soiling properties against permanent marker | 3 | 3 | 4 | 3 | 3 | 4 | 3 | 3 | 3 | 5 | 1 | 1 | 1 |
| Abrasion resistance (number of times) | More than 3000 | 2500 | 2500 | More than 3000 | 3000 | More than 3000 | 2500 | 2500 | 3000 | 500 | 500 | 500 | 3000 |

The invention claimed is:

1. A coating composition comprising (A) a fluorine-containing copolymer and (B) a polycarbonate diol, wherein (A) is a fluorine-containing copolymer comprising a fluoroolefin in an amount of 15 to 85 mol % in all the monomer units and one or more organic silicon compounds selected from compounds represented by toe following general formulas (1) and (2) in an amount of 0.001 to 30 mol % in all the monomer units,

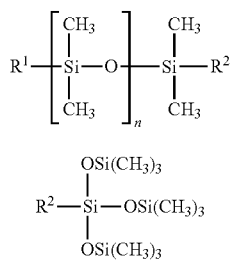

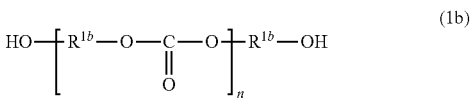

wherein $R^1$ represents an alkyl group with 1 to 6 carbons, $-(CH_2)_r-OOC(CH_3)C=CH_2$ or $-CH=CH_2$, $R^2$ represents $-(CH_2)_r-OOC(CH_3)C=CH_2$ or $-CH=CH_2$, n represents a number of 1 to 420, and r represents a number of 1 to 6.

2. The coating composition according to claim 1, wherein (A) is a curable fluorine-containing copolymer, and the composition comprises a curing agent for the curable fluorine-containing copolymer.

3. The coating composition according to claim 2, wherein (A) is a curable fluorine-containing copolymer having a hydroxyl group, and the curing agent for the curable fluorine-containing copolymer is a polyvalent isocyanate compound.

4. The coating composition according to claim 2, wherein the composition comprises the curing agent in an amount of 1 to 300 parts by mass relative to 100 parts by mass of (A).

5. The coating composition according to claim 1, wherein the composition comprises (A) in an amount of 1 to 90 mass %.

6. The coating composition according to claim 1, wherein the composition comprises (B) in an amount of 0.1 to 50 mass %.

7. The coating composition according to claim 1, wherein the composition comprises (B) in an amount of 1 to 300 parts by mass relative to 100 parts by mass of (A).

8. The coating composition according to claim 1, wherein (B) is a polycarbonate diol represented by the following formula (1b), $$HO-\left[R^{1b}-O-\underset{\underset{O}{\|}}{C}-O\right]_n R^{1b}-OH \quad (1b)$$

wherein $R^{1b}$ is a divalent hydrocarbon group with 2 to 20 carbons, and n is a number of 1 to 1000.

9. The coating composition according to claim 1, wherein the composition further comprises (C) a solvent.

10. The coating composition according to claim 9, wherein (C) is an organic solvent.

11. The coating composition according to claim 9, wherein the composition comprises (C) in an amount of 1 to 99 mass %.

12. A coated article comprising a substrate and a cured film of the coating composition according to claim 1 formed on the substrate.

13. The coated article according to claim 12, wherein the cured film has a film thickness of 0.1 to 100 μm.

14. The coated article according to claim 12, wherein the cured film has a 60° gloss value of 10 or less.

15. The coated article according to claim 12, wherein the substrate is formed to include a material selected from polyurethane, vinyl chloride, polyester, polyolefin, glass and metal.

16. The coated article according to claim 12, wherein the substrate is in the form of a film or a sheet.

17. A method for forming a cured film comprising, applying the coating composition according to claim 1 to a substrate to form a coating film, and curing the coating film to form a cured film.

18. The method for forming a cured film according to claim 17, wherein the cured film has a film thickness of 0.1 to 100 μm.

19. The method for forming a cured film according to claim 17, wherein the cured film has a 60° gloss value of 10 or less.

20. The method for forming a cured film according to claim 17, wherein the substrate is formed to include a material selected from polyurethane, vinyl chloride, polyester, polyolefin, glass and metal.

21. The method for forming a cured film according to claim 18, wherein the substrate is in the form of a film or a sheet.

22. The method for forming a cured film according to claim 17, wherein the curing is made by heating the coating film to 30 to 250° C.

\* \* \* \* \*